United States Patent [19]

Pietsch

[11] 4,413,829
[45] Nov. 8, 1983

[54] SHAFT SEALING ASSEMBLY

[75] Inventor: Günter Pietsch, Hamburg, Fed. Rep. of Germany

[73] Assignee: Howaldtswerke-Deutsche Werft Aktiengesellschaft Hamburg und Kiel, Hamburg, Fed. Rep. of Germany

[21] Appl. No.: 350,022

[22] Filed: Feb. 18, 1982

[30] Foreign Application Priority Data

Feb. 20, 1981 [DE] Fed. Rep. of Germany ........ 3106318

[51] Int. Cl.$^3$ .......................... F16C 33/74; F16J 15/40
[52] U.S. Cl. .......................................... 277/3; 277/15; 277/22; 277/59
[58] Field of Search ..................... 277/30, 59, 15, 3, 22

[56] References Cited

U.S. PATENT DOCUMENTS

| | | | |
|---|---|---|---|
| 2,219,064 | 10/1940 | Boter et al. | 277/30 |
| 3,088,744 | 5/1963 | Ezekiei et al. | 277/30 |
| 3,650,582 | 3/1972 | Casey | 277/15 |
| 3,843,140 | 10/1974 | Mayer | 277/15 |
| 3,847,453 | 11/1974 | Herbert | 277/59 |
| 3,866,924 | 2/1975 | French | 277/30 |
| 3,936,057 | 2/1976 | Walter | 277/59 |

*Primary Examiner*—Robert I. Smith
*Attorney, Agent, or Firm*—Jon M. Lewis

[57] ABSTRACT

A shaft sealing assembly containing a liquid lubricant uses an arrangement which can accommodate shaft-eccentricities and vibratory movements which cause radial deflections of the shaft, without impairing the efficiency of sealing of the assembly. The assembly is of a type using a housing in which two flexible sealing rings are spaced apart from each other and mounted to be stationary on the shaft, at least one sealing ring being supported by a mounting ring. The mounting ring is capable of radially being displaced within the housing, when there is shaft-eccentricity, or when radial vibratory movements of the shaft occur. The mounting ring is nonrotatably supported from the inside of the housing by a resilient annular wall made of a sealing material. The arrangement comprises at least one inner annular chamber containing the liquid lubricant, and at least one outer annular chamber disposed radially outside the mounting ring, the two annular chambers being provided with a connecting fluid passage. Rotation of the shaft causes the lubricant from the inner chamber to be guided by deflectors into the outer chamber via the fluid passage. The lubricant is cooled in the outer chamber and led back into the inner chamber. The shaft sealing assembly is particularly useful as an aft-stern tube seal of a vessel, providing seal-safety and long seal-life.

8 Claims, 4 Drawing Figures

SHAFT SEALING ASSEMBLY

BACKGROUND OF THE INVENTION

The invention relates to improvements in shaft sealing assemblies in which at least two sealing rings within a housing are spaced part from each other and seal against a rotating shaft or against a bush fastened on a rotating shaft, wherein the sealing rings are lubricated by a liquid lubricant in at least one annular chamber between the sealing rings. The invention is applicable particularly to aft-stern tube seals of vessels.

Shaft sealing assemblies of the foregoing type have widespread applications in protecting a rotating shaft-end which emerges from a housing which has to be protected against ingress of moisture, dirt, dust and other contaminants. While innumerable shaft sealing arrangements are known in the prior art ranging from the simplest to those which are very sophisticated, the known sealing arrangements cater to specific requirements and operating conditions and are not universally suitable for all applications. Specifically, while reckoning the functional requirements of shaft seals for aft-stern tube seals of ships, cognizance must be taken of the fact that the seal should function effectively and providing a long life in a very hostile and unfavorable operating environment which includes enormous turbulence of the water in which the ship travels, as also the abrasive particles such as silt or sand and other pollutants or chemicals which might have contaminated the water. The shaft seal for aft-stern applicants should also withstand deleterious vibrations and effects of shaft-eccentricity, without creating a need for frequent and premature replacement of the sealing lubricant within the shaft sealing assembly. Frequent replacements of the shaft sealing lubricant with clean sealing lubricant is cumbersome and uneconomical; besides, any need for frequent lubricant replacement indicates that the shaft seal is letting in ingress of contaminants because of deterioration. The present invention is directed to providing an effective shaft sealing assembly such as for an aft-stern seal of a vessel, to withstand against vibrations and shaft-eccentricity in particular.

DESCRIPTION OF PRIOR ART

In the prior U.S. Pat. No. 3,936,057, a shaft seal is described in which a liquid lubricant, circulated in an annular space by the rotation of the shaft, is forced by a deflector element to flow through conduit-like passages to a tank for cooling the lubricant. This lubrication and cooling system works reasonably well but is mainly limited in application to only the forward seal of stern tube bearings. The arrangement necessary for aft-stern tube seals cannot be sufficiently protected against damage by shaft-eccentricity or bending of the shaft or other external influences, if the hitherto known shaft seal assembly is used.

SUMMARY OF THE INVENTION

Known prior art arrangements including the shaft seal assembly taught in the U.S. Pat. No. 3,936,057 have had a potential disadvantage in that the mounting ring which supports at least one of first and second sealing members radially inwardly (of the mounting ring) was substantially rigidly mounted within the assembly housing. Consequently, over a period of use, the shaft seal assembly after being subjected to forces of shaft-eccentricity, vibratory forces and other external factors would deteriorate, allowing ingress of contaminants, thus leading to a total premature destruction of the shaft seal assembly. The mounting ring in accordance with the broad concept of this invention is made of a hard light material, for example, hard plastics, and is mounted within the housing by using a resilient annular wall which extends from the outside periphery of the mounting ring to an inside periphery of the housing. Thus, the mounting ring is capable of undergoing radial movements in all directions, thereby accommodating shaft-eccentricity and vibratory movements of the shaft.

The present invention in its broad form comprises a shaft sealing assembly for sealing a shaft extension emerging from a housing which is at least partly cylindrical, the assembly comprising: at least one lip type sealing element disposed within said housing for making a seal on the shaft extension to be sealed, said sealing element being fastened to and supported by a mounting ring means, said mounting ring means being disposed substantially coaxially with the shaft, said mounting ring means in turn being nonrotatably supported within said housing by an annular shaped resilient wall member, said annular shaped wall member being fastened along its outer periphery to an inside surface of said housing, whereby, by the flexing action of said wall member, said mounting ring in use is capable of radial displacements so as to accommodate any shaft-eccentricity and vibratory radial displacements of said shaft extension.

In a preferred embodiment described herein, there is provided a shaft sealing assembly in which at least one inner annular chamber is formed between two axially spaced sealing rings; also provided are a bush rotating with the shaft and a mounting ring surrounding the inner annular chamber, in which the liquid lubricating the sealing rings is deflected by the rotation of the shaft and is forced to circulate through passages to and back from a cooling zone; the cooling zone advantageously comprises an outer annular chamber surrounding the mounting ring and is inside the housing of the assembly, the housing per se, in use, being cooled by a surrounding medium such as sea water. Expediently, the circulation of the lubricating liquid is forced by separate deflector elements which are positioned in the inner chamber as well as in the outer annular chamber. Other alternative means narrowing the cross-section of the inner annular chamber can be used to deflect the lubricating liquid.

A mounting ring, in which at least one of the sealing rings is positioned, is borne on the bush and is radially movable within the housing so that it can follow all radial movements of the shaft, for example, induced by vibrations. The axial clearances or gaps between the radial faces of the mounting ring and the corresponding faces of the housing can be so that small deviations of the axis of the housing from the axis of the shaft or tilting movements are possible. These gaps form further radial passages for the lubricating liquid and are lubricated by the liquid. The mounting ring is preferably made of a hard plastic material such as polyamide, polyethylene, polyvinylcholoride and combinations of such plastics. Such a light-weight mounting ring follows all movements of the shaft very easily and ensures that the local pressure of a lip sealing ring positioned in the mounting ring is uniformly distributed over the circumferential contacting line thereby reducing the danger of local overheating in the sealing ring.

Between the mounting ring and the housing, at least one solid resilient annular wall is provided. The resilient wall centers the mounting ring inside the housing and expediently defines the outer annular chamber at least on one side. The resilient wall preferably extends substantially in a radial direction and prevents the mounting ring from rotating with the shaft but permits radial and tilting movements of the mounting ring inside the housing. In a second embodiment, instead of a solid resilient annular wall, a compressible inflatable tubular wall is used.

According to one illustrated embodiment of the invention, the shaft sealing assembly comprises two inner annular chambers limited partly by sealing rings, and two outer annular chambers separated by a resilient wall, the first inner and outer chambers being connected by channels to form a first lubricating and cooling system; the second inner and outer chambers are provided with intermediate channels and form a second lubricating and cooling system. The lubricating liquids in both the systems can be different, if desired.

DESCRIPTION OF PREFERRED EMBODIMENTS

Figure 1:
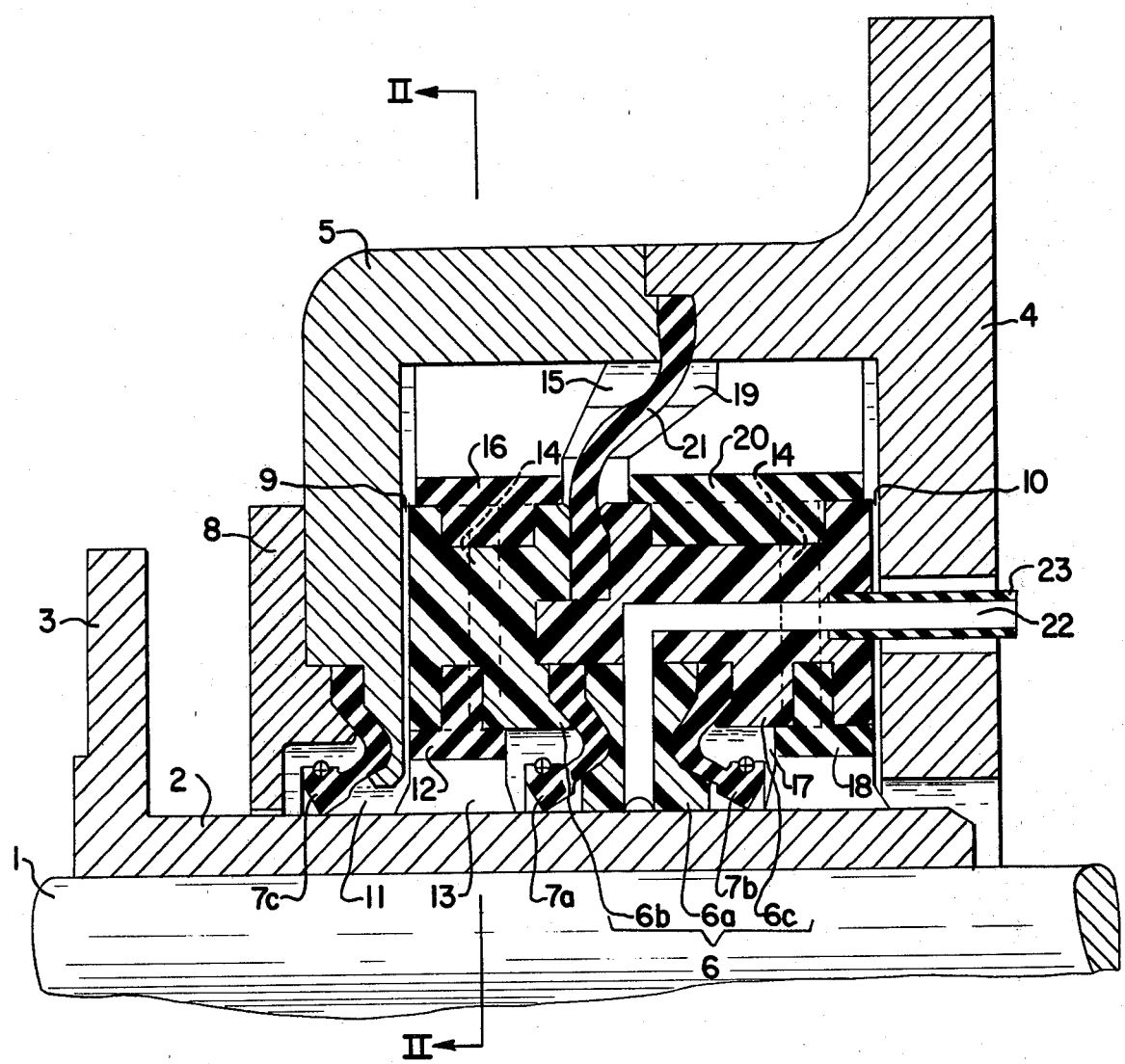
FIG. 1 is a longitudinal sectional diagrammatic view of one half of a shaft sealing assembly having a first and a second lubricating and cooling system the inner and outer chambers of which are connected by channels in a mounting ring, the mounting ring bearing on a bush fastened to a shaft.

Referring to the drawings there is shown in FIG. 1 an aft-stern tube sealing assembly of a vessel in which a bush 2 is arranged on a rotatable shaft 1 and is provided at one end with a flange 3 for fastening to a propeller flange (not shown), the other end of the shaft extending into a stern tube bearing (not shown). The sealing assembly is mounted by means of a fastening flange 4 onto a stern boss which is not shown. A cap 5 is fastened by any suitable means such as screws (not shown) to a collar extending from the fastening flange 4.

The fastening flange 4 and the cap 5 form the housing of the sealing assembly. In the housing there is a mounting ring 6 which surrounds the bush 2. As shown, the mounting ring 6 consists of three ring parts 6a, 6b and 6c which are kept together by screws (not shown). Preferably the parts of the mounting ring 6 are made of a light material such as plastics. The mounting ring 6 is radially movable within the housing; small axial and tilting motions of the mounting ring are accommodated because of axial gaps or clearances 9, 10 between the radial faces of the mounting ring 6 and of the fastening flange 4 respectively of the cap 5. The ring part 6a is borne on the bush 2.

A sealing ring 7a is arranged on the mounting ring and is in sealing contact with the bush 2. Axially spaced from the sealing ring 7a there is another sealing ring 7c which is fastened to the cap 5 by means of a lid 8 at the aft end of the assembly. The sealing rings are preferably lip seals made of a resilient material such as rubber. As shown, an inner annular chamber 11 for a liquid lubricating the sealing rings 7a, 7c is defined by the bush 2, the ring part 6b of the mounting ring 6 and by the sealing rings 7a and 7c.

Figure 2:
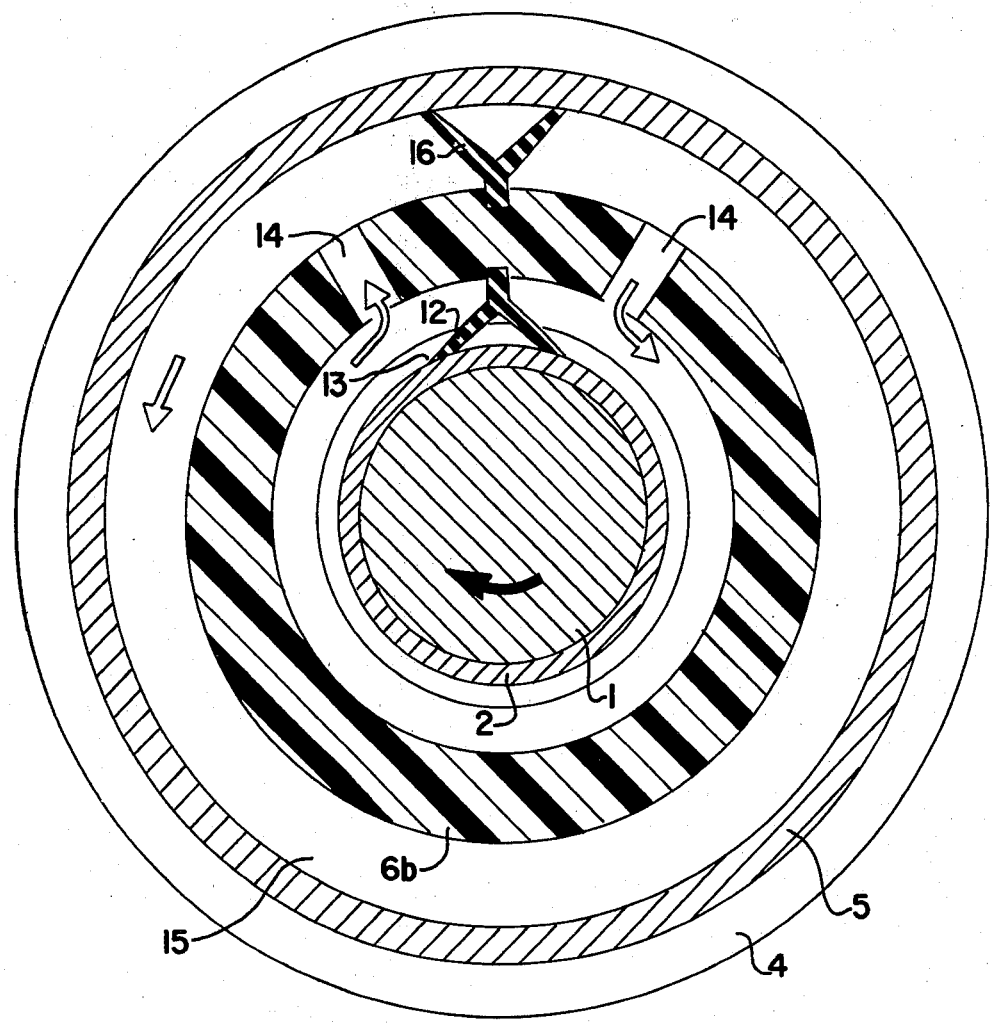
FIG. 2 is a radial sectional diagrammatic view along section II—II in FIG. 1 and shows an inner and an outer annular chamber, the passage channels between the chambers, and deflector elements.

An outer annular chamber 15 for cooling the liquid lubricating the sealing rings 7a, 7c is shown formed between the ring part 6b of the mounting ring 6 and the cap 5 which is a part of the housing. The outer annular chamber 15 and the inner annular chamber 11 are connected by two passages or channels 14 in the ring part 6b. In the inner annular chamber 11 a deflector element 12 is positioned between the channels 14. The deflector element 12 comprises two resilient arms 13 the ends of which rest on the bush (FIG. 2). The arms 13 of the deflector element 12 do not close the cross-section of the inner annular chamber 11 and do not contact the sealing rings 7a, 7c so that lubrication is not interrupted at the deflector element, but, the lubricant rotating with the bush near the lips of the sealing rings is deflected and whirled. The deflector element forces some of the lubricating liquid rotating in the inner annular chamber to flow through a channel 14 to the outer annular chamber 15 as in shown in FIG. 2, and there the liquid is cooled in the outer chamber of the housing outside which, in use, there is a cooling medium such as sea water. In the outer annular chamber 15 there is another deflector element 16 which leads the liquid through the outer chamber and back to the inner annular chamber 11. Some of the liquid flows also in substantially a radial direction in the clearance 9 between the aft end of the mounting ring 6 and the radial inner area of the cap 5. The deflector element 16 is similar to the deflector element 12 described before, and both are mounted in grooves of ring part 6b of mounting ring 6.

Figure 3:
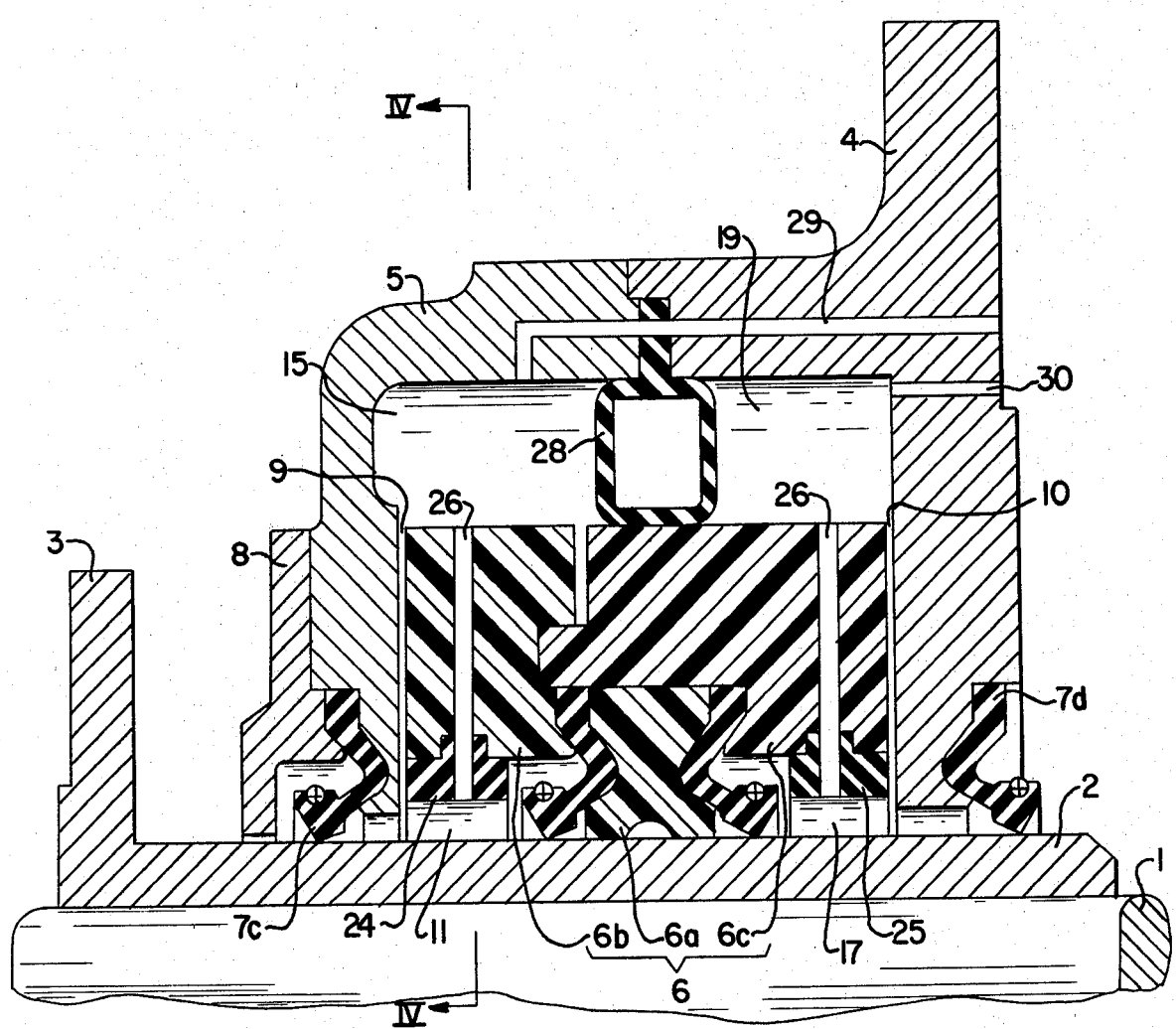
FIG. 3 is a longitudinal diagrammatic sectional view of a second embodiment showing one half of a shaft sealing assembly having a first and a second lubricating and cooling systems, the outer chambers of which are separated by a compressible tubular wall, the assembly having means narrowing the cross-section of the inner chambers to force-circulate the lubricating liquids through the cooling systems.

The embodiment according to FIG. 1 comprises a second lubrication and cooling system with a second inner annular chamber 17, a second outer annular chamber 19, further channels 14, and deflector elements 18 and 20. The second inner annular chamber 17 extends axially between a sealing ring 7b mounted to the mounting ring 6 and the aft end of the stern tube bearing which is not shown. The second lubrication and cooling system can communicate with the lubrication of the stern tube bearing so that the oil of that bearing lubricates also the sealing ring 7b and is present also in the second inner and outer annular chambers 17, 19 respectively. However, a further sealing ring 7d as shown in FIG. 3 for separating the second system from the stern tube bearing can be provided. The first and second outer annular chambers 15, 19 are separated by a resilient wall 21 which also prevents the mounting ring 6 from rotation. Different lubricating liquids can be used in the first cooling system comprising the annular chambers 11, 15 and the second cooling system comprising the second annular chambers 17, 19. In any case the resilient wall 21 prevents sea water which occasionally may enter the first system from coming into the second lubrication system.

If lubrication of the ring part 6a of the mounting ring 6 is necessary, some lubricant can flow through a channel 22 connected by a flexible pipe 23 from a supply source which is not shown.

Figure 4:
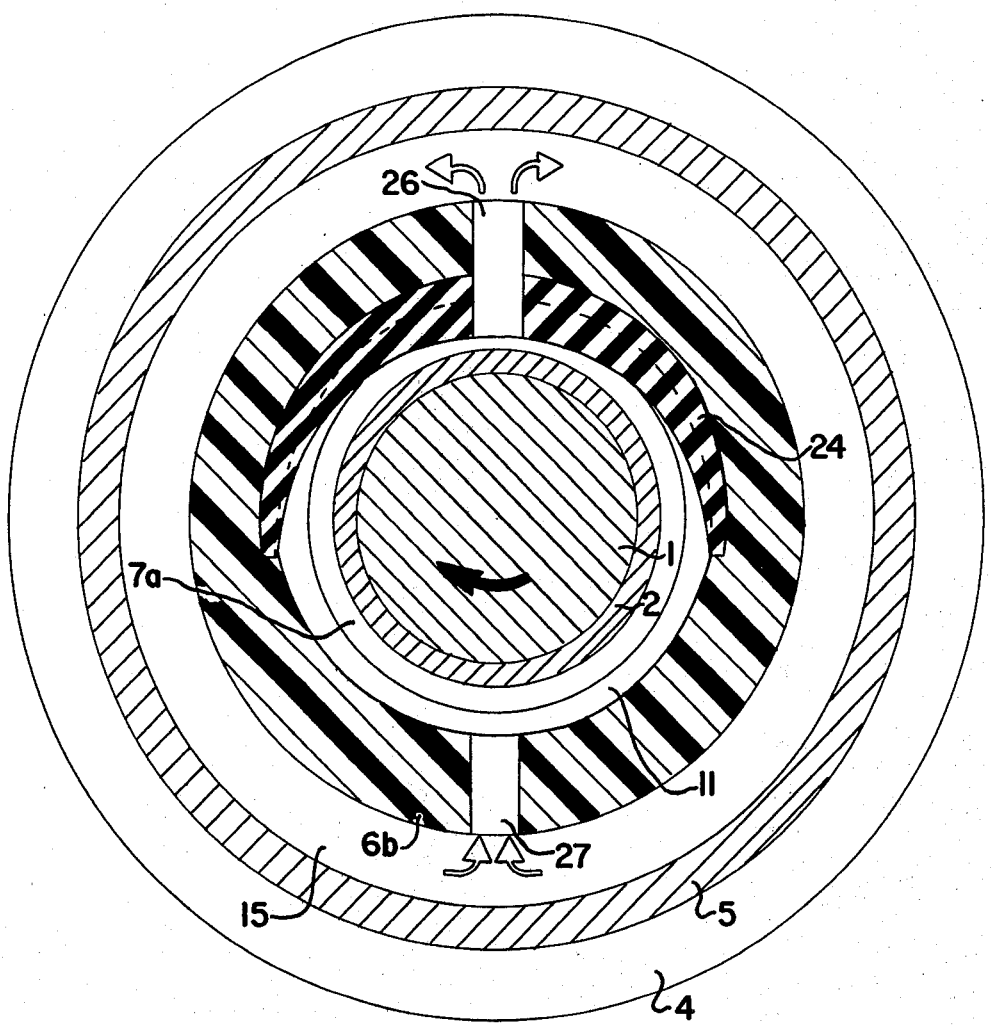
FIG. 4 is a diagrammatic radial sectional view along section IV—IV in FIG. 3 showing the means for circulating the lubricating liquid and the passage-channels between inner and outer chambers.

In the embodiment according to FIGS. 3 and 4, in which the same reference numerals are used, the flow of the lubricating liquids from the inner annular chambers 11, 17 to the outer annular chambers 15, 19 respectively is achieved by elements 24, 25 inserted in the inner chambers and narrowing their cross-section. At the narrowest sections of the inner chambers outlet channels 26 lead the lubricating liquid to the outer chambers 15, 19; at a diametrically opposite point, inlet channels 27 are positioned through which the cooled liquid lubricant returns to the inner chambers 11, 17.

In this example the outer annular chambers 15, 19 are separated by a tubular wall 28 of resilient material. The tubular wall 28 is compressible by radial movements of the mounting ring and by expansion of the liquids included in the first and in the second lubrication systems. Furthermore, it is possible to inflate the resilient tubular wall by compressed air or by a liquid through a pipe (not shown) from a supply source inside the ship.

A conduit passage 29 can be provided in the housing 4, 5 which leads from the first outer annular chamber to a control valve or a safety valve inside the ship (not shown) so that the quality of the lubricating liquid in the first lubrication system can be checked. Another pipe 30 in the fastening flange 4 can be provided for inspecting the second lubrication system. For each lubrication system two pipes, 29 resp. 30 can be used so that it is possible to replace the lubricating liquid after a predetermined length of time, or sooner if necessary.

The pressure head caused by pressure differences of the lubricating liquid in a lubrication and cooling system caused by deflector elements or other means for circulating is relatively small, and therefore it is preferable that the passages or channels 14, 26, 27 are very short (so as to require a low pressure head for fluid flow). Furthermore, these channels in the mounting ring 6 cannot usually break or become squeezed off. The volume of the outer annular chambers 15, 19 can be much greater than that of the inner annular chambers 11, 17 so that sufficient cooling of the liquid is achieved and a substantial amount of liquid can be present in a closed system without need of replacing it frequently. The wear of the essential sealing rings 7a, as also the ingress of water into the stern tube bearing and 7b against exudation of oil from the bearing are both reduced because rings 7a and 7b are mounted in the mounting ring 6 which can radially move and follow all eccentric motions of the shaft, and also because the rings 7a, 7b are lubricated by a cooled lubricant. Thus the life of the sealing rings is substantially lengthened.

The invention is not restricted to stern tube seals, as other shafts of watercraft, water power machines, etc. can be sealed in the described manner, and within the scope of the invention are also further embodiments having more than two outer and inner annular chambers, other type of sealing rings or further variations.

The invention is not to be taken as limited to all the details thereof described hereinabove, since modifications and variations thereof may be made without departing from the scope of the invention.

What is claimed is:

1. A shaft sealing assembly for sealing a shaft extension emerging from a housing which is at least partly cylindrical, the assembly comprising: at least one lip type sealing element disposed within said housing for making a seal on the shaft extension to be sealed, said sealing element being fastened to and supported by a mounting ring means of composite construction, said mounting ring means being disposed substantially coaxially with the shaft, said mounting ring means in turn being nonrotatably supported within said housing by an annular shaped resilient wall member, said annular shaped wall member being fastened along its outer periphery to an inside surface of said housing, whereby, by the flexing action of said wall member, said mounting ring in use is capable of radial displacements so as to accommodate any shaft-eccentricity and vibratory radial displacements of said shaft extension, wherein said mounting includes a plurality of ring elements fastened together and supporting two of said sealing elements which are axially spaced from each other and disposed on said shaft extension, the shaft assembly including: an additional lip type sealing element adapted to be disposed on said shaft extension and supported by an end portion of said housing, said assembly including a first annular shaped reservoir chamber defined partly by a surface of the shaft extension and partly by said at least one sealing element and said additional sealing element and partly by an inner surface of the mounting ring, said reservoir chamber adapted to contain a liquid lubricant; an outer annular chamber disposed radially outside of and substantially coaxial with said first annular chamber, the assembly including a first liquid passage in the form of a conduit interconnecting said first and outer annular chambers, the shaft sealing assembly including a first stationary deflector means supported by said mounting ring to extend towards the shaft, said deflector means being so shaped as to cause a whirl of said liquid lubricant and force the lubricant from said first annular shaped reservoir chamber to said outer annular chamber via said first liquid passage.

2. Shaft sealing assembly as in claim 1, including a second stationary deflector means supported on an outer surface of the mounting ring and disposed extending radially away from the shaft, the assembly further including at least a second fluid passage in the form of a conduit interconnecting said first reservoir chamber and said outer chamber, the second fluid passage being so disposed as to assist return of the liquid lubricant from the outer chamber to the first reservoir chamber for recirculation of the liquid lubricant.

3. Shaft sealing assembly as in claim 2, wherein said first and second stationary deflector means are members having a Y shaped cross-section being supported by the mounting ring in a manner not totally impeding circumferential flow of liquid lubricant in the first chamber and said outer chamber.

4. Shaft sealing assembly as in claim 2, wherein said mounting ring comprises material selected from a group comprising polyamide, polyethylene, polyvinylchloride and combinations thereof.

5. A shaft sealing assembly according to claim 1 including additional second circulation system comprising second inner annular chamber for a lubricating liquid; a second outer annular chamber for cooling the lubricating liquid of the second inner annular chamber; a resilient wall for separating said first and second outer annular chambers, channels for connecting the second inner and outer annular chambers, and deflector elements arranged in second inner and outer annular chambers.

6. A shaft sealing assembly according to claim 1 wherein a bush is fastened nonrotatably to the shaft in close fitting therewith, wherein the housing includes radial internal faces, wherein said mounting ring is borne on the bush and is radially movable within the housing, the assembly including clearances between said radial faces of the housing and said mounting ring, said clearances being lubricated by circulating liquid thereby forming further passages for said circulating liquid.

7. A shaft sealing assembly for sealing a shaft extension emerging from a housing which is at least partly cylindrical, the assembly comprising: at least first and second lip type sealing elements which are axially displaced and disposed on the shaft extension, at least one of said sealing elements being fastened to and supported by a mounting ring means, said mounting ring means being disposed substantially coaxially with the shaft and the cylindrical portion of said housing, said mounting ring in turn being nonrotatably supported within the cylindrical portion of said housing by a substantially annular shaped, resilient wall member, said wall member being chemically resistant to liquid lubricant, for lubricating at least said assembly, said wall member per se being fastened along its outer periphery to an inside surface of the cylindrical portion of the housing; an inner annular chamber for containing said liquid lubricant and being formed between the shaft surface and an inner periphery of the mounting ring; an outer annular chamber formed between an outer surface of the mounting ring and an inner surface of the housing; first and second conduits in the form of liquid passages through the mounting ring and establishing fluid connection between said inner chamber and said outer chamber; means responsive to the shaft rotation for causing a whirl of the liquid lubricant in said inner annular chamber to force the liquid lubricant through one of said conduits into said outer chamber for facilitating cooling of the liquid lubricant, the other of said conduits for returning the liquid lubricant to the inner chamber for recirculation, whereby, by the flexing action of the resilient wall member, the mounting ring in use is capable of radial displacements to accommodate any shaft-eccentricity and vibratory radial displacements of the shaft extension.

8. A shaft sealing assembly for rotating shafts comprising:
(a) a rotatable shaft and a bush fastened to the shaft,
(b) a non-rotating mounting ring surrounding the bush,
(c) a housing in which the mounting ring is radially movably accommodated, said housing containing a liquid lubricant,
(d) two sealing rings spaced apart axially from one another and sealing against the bush, one of said sealing rings being arranged in the mounting ring,
(e) an inner annular chamber for containing said liquid lubricant, the inner annular chamber being defined at least partly by said sealing rings, the mounting ring and the bush,
(f) an outer annular chamber for cooling said liquid lubricant which outer annular chamber is formed between the mounting ring and the housing,
(g) channels in the form of conduits in the mounting ring for connecting the inner and outer annular chambers, and
(h) means for circulating said liquid in and between both said annular chambers by rotation of the shaft, said circulating means comprising a stationary deflector element in the inner annular chamber and another stationary deflector element in the outer annular chamber, both the deflector elements narrowing the cross-section of said circular chambers and forcing a part of said liquid lubricant in one chamber to flow to the other chamber.

* * * * *